Nov. 12, 1968   W. J. WIESE   3,410,566

SEALING MEMBER FOR MECHANICAL SEALS

Filed March 28, 1966   2 Sheets-Sheet 1

WINFRED J. WIESE
INVENTOR.

BY John O. Evans, Jr.

ATTORNEY

Nov. 12, 1968   W. J. WIESE   3,410,566
SEALING MEMBER FOR MECHANICAL SEALS
Filed March 28, 1966   2 Sheets-Sheet 2

WINFRED J. WIESE
INVENTOR.

BY John O. Evans, Jr.

ATTORNEY

United States Patent Office 3,410,566
Patented Nov. 12, 1968

3,410,566
SEALING MEMBER FOR MECHANICAL SEALS
Winfred J. Wiese, Whittier, Calif., assignor to Borg-Warner Corporation, Chicago, Ill., a corporation of Illinois
Filed Mar. 28, 1966, Ser. No. 537,779
9 Claims. (Cl. 277—81)

ABSTRACT OF THE DISCLOSURE

A mechanical seal in which either the rotary sealing member or the stationary sealing member is a monolithic structure having a sealing ring portion, a spaced mounting ring portion in the form of a closed ring, and a radial set screw for clamping the mounting ring portion to its support. The sealing ring portion is joined to and driven by the mounting ring portion through a pair of oppositely disposed, axially extending webs located 90° on either side of the set screw. Stresses set up in the mounting ring portion when the set screw is tightened are not substantially transferred through the webs to the sealing ring portion which, with its sealing surface, remains substantially undistorted.

---

This invention relates to mechanical seals, and more particularly to sealing members therefor.

Mechanical seals are used to prevent fluid flow through the opening between a rotating shaft and a housing through which the shaft passes. Such seals include a rotary ring that is mounted on the shaft and that has a sealing surface disposed in sealing relation to a complementary sealing surface on a stationary ring which is mounted on the housing. The rings are sealed to the respective members on which they are mounted. Usually, at least one of the rings is movable axially on the shaft and spring-biased into sealing relation with the other of the rings.

The complementary sealing surfaces of the rings generally extend radially of the shaft. These surfaces are lapped to a high degree of flatness, and preferably are uniformly flat within about ten millionths of an inch, as determined by comparison with an optically flat glass surface under monochromatic light. The lapped sealing surfaces of the rings need to be as flat as practicable to assure proper sealing.

It is, therefore, an object of the invention to provide a sealing member for a mechanical seal, the sealing surface of which member will not be appreciably distorted when the member is mounted on a shaft, a housing, or other support.

Another object of the invention is to provide a sealing member that may be mounted on a support by mounting means that, although they impose non-uniform stresses in the member, yet they do not impair the flatness of the sealing surface.

Another object of the invention is to provide a sealing member that employs a set screw for mounting it on a support without sealing-surface distortion.

Another object is to provide a sealing member fulfilling one or more of the foregoing objects which is also simple, rugged, and economical, and which has a long and trouble-free service life.

In brief, the invention resides in the combination of a sealing member for a mechanical seal and a support member therefor including the support member having a generally cylindrical surface for mounting the sealing member; the sealing member being mounted on the support member and comprising a monolithic structure having a mounting ring portion with a substantially cylindrical mounting surface in juxtaposition with the mounting surface of the support member, regulatable means for clamping the mounting ring portion to the mounting surface of the support member, a closed sealing ring portion axially aligned with and axially spaced from the mounting ring portion, and having a substantially annular sealing surface thereon, axially extending web means, having less than 360° of circumferential extent, integral with the mounting ring portion and the sealing ring portion for drivingly connecting the sealing ring portion to the mounting ring portion, and means for sealing the sealing ring portion to the support member. The improvement in the foregoing combination comprises the mounting ring portion being a closed ring; the regulatable means comprising adjustable means on one of the mounting ring portion and the support member reacting, at a limited circumferential area, with stationary means on the other of said mounting ring portion and said support member to apply radial force to the mounting ring portion at a limited circumferential area thereof for clamping the mounting ring portion to the mounting surface of the support member, the radial force producing two zones of greatest stress in the mounting ring portion, the first of which is at and adjacent to the limited circumferential area of the mounting ring portion and the second of which is located substantially opposite to the first; and the axially extending means being a pair of circumferentially spaced web means positioned on diametrically opposite sides of the sealing member, each of the pair of web means being spaced substantially 90° from the limited circumferential area of the mounting ring portion, whereby stresses in the mounting ring portion are substantially prevented from being reflected in the sealing ring portion to distort the sealing surface.

The invention will be set forth with greater particularity in the following detailed description taken with the accompanying drawings, in which.

In the drawings and in the following description, like reference numerals designate corresponding parts.

Figure 1:
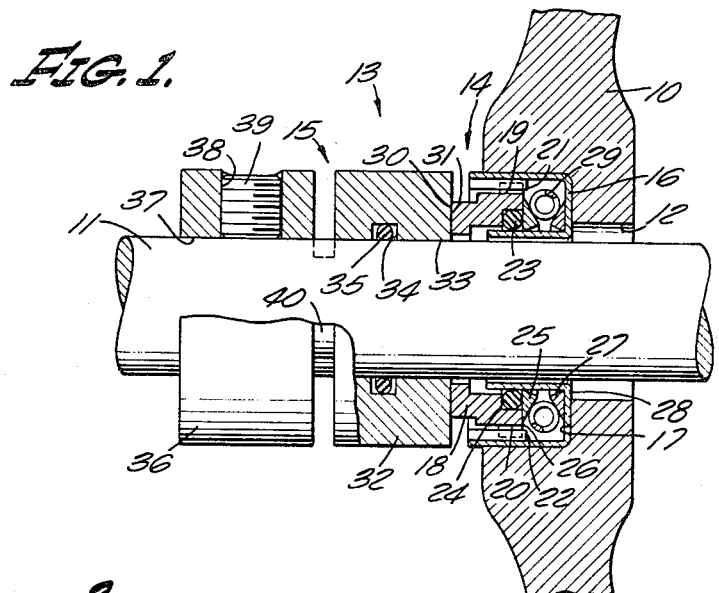
FIG. 1 is an axial, sectional view of a typical mechanical seal installation including one form of sealing member in accordance with the invention, a fragmentary portion of the member being shown in elevation.
Figure 2:
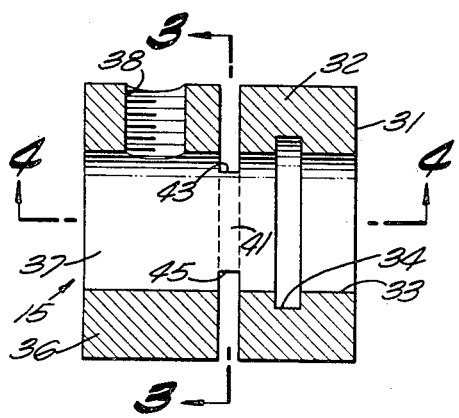
FIG. 2 is an axial sectional view, on the same scale as FIG. 1, of the sealing member shown in FIG. 1.

Referring to the drawings, particularly to FIG. 1, the mechanical seal assembly shown therein is installed in a wall 10, which, for example, may be a portion of a pump housing containing a pump impeller (not shown) attached to the shaft 11 at the left. The shaft extends through a shaft opening 12 in the wall 10 and is rotated by a driver (not shown) at the right. The shaft is carried by bearings (not shown). When the pump is in operation, the fluid in the housing (to the left of the wall 10) is at high pressure. The pressure external to the housing (to the right of the wall 10) is lower, and usually is the normal pressure of the atmosphere.

The mechanical seal assembly is designated by the general reference numeral 13. Its purpose is to prevent leakage of fluid from the housing to the exterior through the annular space between the walls of the shaft opening 12 and the shaft 11. The mechanical seal assembly has a stationary sealing ring subassembly 14, mounted in the housing wall 10, and a rotary sealing member 15 attached to the shaft 11. The subassembly and sealing member cooperate with each other to seal the shaft 11 to the housing wall 10, whether the shaft be stationary or rotating.

Merely exemplary of various forms of stationary sealing ring subassemblies that may be used in connection with the rotary sealing member of the invention is the subassembly 14, which has a case 16 in the form of an annular trough that is press-fitted into a cylindrical recess 17 formed in the wall 10 as a continuation of the shaft opening 12. The case is received in the recess with an interference fit that blocks the flow of fluid between the case and the walls of the recess. A stationary sealing ring 18, which typically is a carbon ring, is axially slidably mounted in the case 16. The ring 18 has diametrically opposed grooves 19 and 20 in its outer periphery that receive lugs 21 and 22, fixed to the case 16, for restraining the ring from rotation in the case, while allowing it to move axially. An elastomeric O-ring 23 is seated in a groove 24 in the inner periphery of the sealing ring 18 and is compressed between the sealing ring and the case 16 to seal the ring to the case without substantially interfering with the axial movement of the sealing ring.

A tapered follower ring 25 is positioned against the rear face 26 of the sealing ring, and a similar tapered ring 27 is placed in the case adjacent to the bottom wall 28 thereof to provide a radially inwardly tapered, annular channel in which a garter spring 29 is received. The garter spring, which is in tension, tends to contract and react against the inclined surfaces of the tapered rings 25 and 27 to bias the stationary sealing ring 18 to the left.

The stationary sealing ring has a radial sealing surface 30 that is lapped to optical flatness, and is positioned in opposed sealing relation to a complementary, optically flat, radial sealing surface 31 on the rotary sealing member 15.

The sealing member 15, shown in FIGS. 1 to 4, is an exemplary form of rotary sealing member in accordance with the invention. The member 15 has a sealing ring portion 32 that is cylindrical and is provided with an axial bore 33 through which the shaft 11 extends. An annular O-ring groove 34 is formed in the inner periphery of the sealing ring portion 32, and an O-ring seal 35 is compressed in the groove between the ring portion 32 and the shaft 11 for preventing the fluid in the housing from leaking out between the sealing ring portion and the shaft.

The member 15 also has a cylindrical mounting ring portion 36 having a bore 37 through which extends the shaft 11. A radially extending, threaded bore 38 has a set screw 39 threaded therein. The set screw is tightened firmly against the shaft to secure the mounting ring portion upon the shaft so that the mounting ring portion and the shaft will turn together and the mounting ring portion will not slide axially on the shaft.

Figure 3:
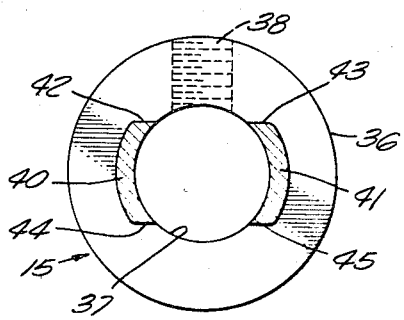
FIG. 3 is a sectional view taken on the line 3—3 of FIG. 2 and looking in the direction of the arrows.
Figure 4:
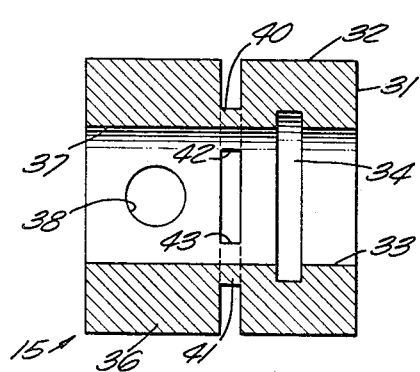
FIG. 4 is a sectional view taken on the line 4—4 of FIG. 2 and looking in the direction of the arrows.

A pair of axially extending, circumferentially spaced, webs 40 and 41 integrally unite the sealing ring portion 32 to the mounting ring portion 36. These webs mechanically fix the ring portions together; the webs transmit torque from the mounting ring portion to the sealing ring portion and restrain the sealing ring portion from axial displacement. As best seen in FIG. 3, the webs, in transverse section, are annular segments coaxial with the ring portions 32 and 36, and have inner radii equal to the radii of the bores 33 and 37. The outer radii of the webs are enough greater than their inner radii to provide webs of fairly thin radial dimension, yet of sufficient thickness adequately to support the sealing ring portion on the mounting ring portion. The webs 40 and 41 are positioned diametrically opposite to each other, and are centered on a diameter which is at right angles to a plane containing both the axis of the set screw bore 38 and the axis of the shaft bores 33 and 37. Insofar as is consistent with the provision of required structural strength, the webs extend arcuately for the minimum practicable distance. Preferably, the longitudinal surfaces 42 and 43 of the webs are offset as far as feasible from the set screw bore, and the opposite edges 44 and 45 are offset an equal distance from an imaginary projection of the set screw bore upon the opposite side of the shaft bore 37; see FIG. 3.

The lengths of the webs 41 and 42 in the axial direction may be relatively short as compared to their arcuate dimensions. In the particular member shown in FIGS. 1 to 4, the length of each web is approximately one-fifth its arcuate dimension.

The sealing member 15 can be fabricated in a wide variety of ways that will be obvious to the ordinarily skilled craftsman or machinist. It may be machined from a single piece of solid, round, bar stock. Or, it may be built-up by welding webs between two initially separate ring portions to form a unitary structure. Other methods of fabricating the sealing member are also envisaged.

From the foregoing description, the operation of the mechanical seal arrangement of FIG. 1, in its character as a mechanical seal, will be apparent to those skilled in this art. In brief, upon rotation of the shaft 11, the sealing face 31 of the rotary sealing member turns relatively to the complementary sealing face 30 of the stationary sealing ring 18. Fluid within the housing cannot by-pass the rotary sealing ring portion 32 or the stationary sealing ring 18, the fluid being precluded from so doing by the O-rings 35 and 23. As pressure within the housing builds up, a thin film of fluid normally flows radially inwardly between the sealing faces 30 and 31 to lubricate and cool them.

Warping or distortion of the sealing faces will result in an unduly high rate of flow of fluid therebetween, with attendant reduction of sealing efficacy. Indeed, if the warping of the sealing faces is extreme, the high pressure of the fluid between the faces may force the stationary sealing ring 18 so far away from the rotary sealing ring portion 32 that the seal "blows out"; i.e. fluid in the housing rushes out between the sealing faces substantially unimpeded.

The use of a set screw, or other clamping means which lack symmetry, for attaching the rotary sealing member 15 to the shaft induces uneven stresses in the mounting ring portion 36. If these stresses were transmitted through the body of the sealing member to its sealing surface 31, they would cause this surface to become warped, a condition to be avoided. The dividing of the body into two ring portions and the provision of the webs 40 and 41 between the sealing ring portion 32 and the mounting ring portion 36 effectively reduces and substantially prevents the transmission of the non-uniform or asymmetrical stresses to the sealing surface 31, and substantially eliminates warping of this surface. The relative thinness of the webs, and, more importantly, their location, generally centered on a plane transverse to the axis of the set screw, contribute to the blocking of stress transmission from the mounting ring portion to the sealing ring portion; yet the webs provide the necessary mechanical connection of the sealing ring portion to the mounting ring portion.

Figure 5:
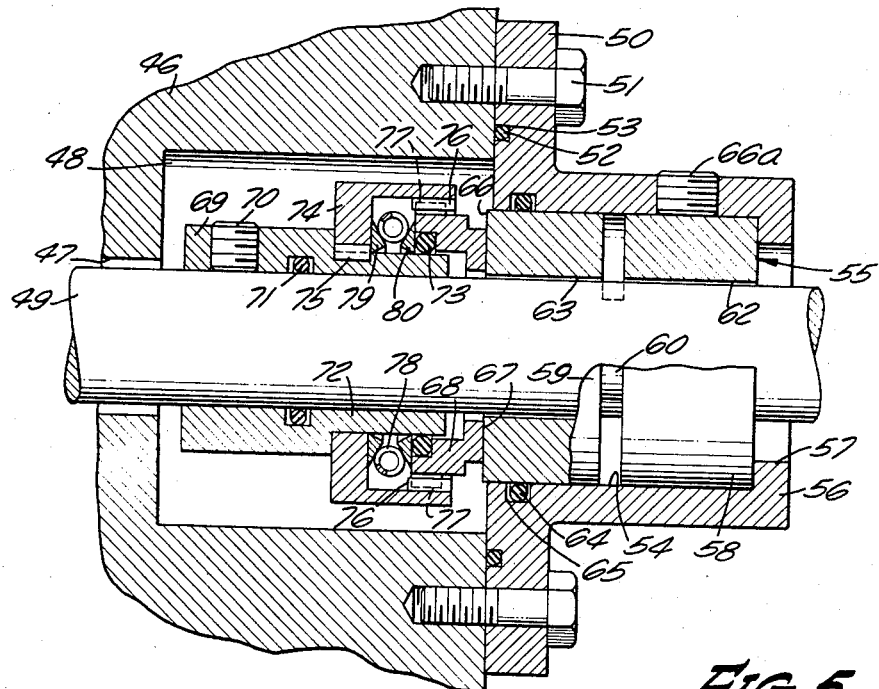
FIG. 5 is an axial sectional view of another typical mechanical seal installation in which another form of sealing member in accordance with the invention is incorporated.
Figure 6:
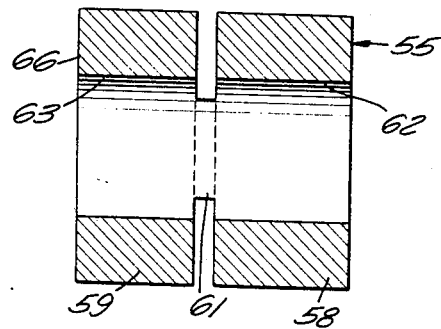
FIG. 6 is an axial sectional view of the sealing member illustrated in FIG. 5 and drawn on the same scale as FIG. 5.

The sealing member of the invention may be adapted to serve as the stationary sealing member of a mechanical seal, as shown in FIGS. 5 and 6. Referring to these figures, there is shown a housing, typically a pump housing, having a wall 46 with a shaft opening 47 communicating with a stuffing box 48. A suitably journalled shaft 49 extends from the interior of the housing at the left through the shaft opening and stuffing box to the exterior. The shaft is driven by a conventional driver (not shown). A stuffing box flange 50 is attached, as by bolts 51, to the outside of the housing wall 46, and is sealed to the housing wall by an O-ring 52 in a groove 53. The flange has a cylindrical bore 54 receiving therein a stationary sealing member 55 in accordance with the invention. The flange is provided with an inturned shoulder portion 56 against which the sealing member 55 is seated, the shoulder forming a shaft opening 57, through which passes the shaft 49.

The stationary sealing member 55 has a mounting ring portion 58 and a sealing ring portion 59. These portions are integrally united with each other by webs 60 and 61. The geometry of the sealing member 55, with particular regard to the webs, is generally similar to the geometry of the rotary sealing member 15 described hereinbefore with reference to FIGS. 1 to 4. However, because the sealing member 55 is stationary in the flange 50, the shaft bores 62 and 63 are sufficiently large in diameter to furnish clearance so that the shaft 49 may rotate freely therein. Moreover, the sealing ring portion 59 is sealed to the stuffing box flange 50 by an O-ring 64 in a groove 65 in the flange bore 54; hence, there is need for an internal O-ring groove such as the groove 34 of the previously described member 15. In addition, the flange has a radial set screw 66a threaded therein and driven tightly against the mounting ring portion of the sealing member 55 to restrain the latter against rotation in the flange bore 54; thus, the mounting ring portion 58 does not require and, hence, has no threaded set screw bore such as the set screw bore 38 of the sealing member 15 of FIGS. 1 to 4.

The sealing ring portion 59 has an optically flat, radially extending, planar sealing surface 66 that is opposed in sealing relation to the optically flat, complementary, sealing surface 67 of a rotary sealing ring 68.

The rotary sealing ring is carried by the shaft for rotation therewith by an assembly including a shaft sleeve 69 secured to the shaft by a set screw 70 and sealed to the shaft by an O-ring 71. The shaft sleeve has a spigot 72 of reduced diameter that supports the rotary sealing ring 68 on a joint made fluid-tight by an O-ring seal 73. A sealing ring case 74 is keyed to the spigot by a key 75, and to the sealing ring 68 by splines 76 integral with the case, the splines being received in grooves 77 in the outer periphery of the sealing ring. Thus, the rotary sealing ring is driven by the shaft through the shaft sleeve 69 and the case 74. The rotary sealing ring is resiliently biased axially towards the stationary sealing ring portion 59 by a garter spring 78 reacting against tapered rings 79 and 80, in a way similar to the resilient biasing of the stationary sealing ring 18 of the assembly of FIG. 1.

The manner of making and using the mechanical seal assembly of FIG. 5 will be readily understood from the foregoing description by one skilled in the mechanical seal art. It will be seen from FIG. 5 that the stationary sealing member 55 is oriented with respect to the radial set screw 66a so that the webs 60 and 61 are bisected by a plane including the longitudinal axis of the shaft bores 62 and 63, which plane is normal to the axis of the set screw. Thus, the webs are disposed as far as possible from the zones of greatest stress in the mounting ring portion 58, which zones are adjacent to and opposite to the area of the mounting ring against which the set screw presses. Therefore, stresses in the mounting ring portion are not substantially reflected in the sealing ring portion 59, and the sealing surface 66 is not distorted.

Expressed in another way, the webs are integral with the mounting ring portion of the sealing member at zones of minimum stress concentration induced in the mounting ring portion when the latter is attached to a shaft, housing, or other support. Whereas, the sealing members shown in the drawings have two webs, more than two webs may be employed, at the zones indicated, when the mounting ring is attached to a support by mounting means that set up more than two zones of stress concentration, as, for example, where two set screws are disposed 90° apart to lock the mounting ring to a shaft.

As illustrative of the reduction of sealing surface distortion achieved by the present invention, a sealing member similar to the member 15 of FIG. 1, but differing from it by being a continuous tubular member without the annular groove and slots that provide the webs 40 and 41, was lapped to provide an optically flat sealing surface 31. This member was then fastened to a shaft by a set screw 39. Interferometric comparison, under monochromatic light, of the sealing surface 31 with an optical flat showed a wavy interference band pattern indicating maximum deviations of the sealing surface from true flatness to five interference bands, or about fifty millionths of an inch. This sealing member was then removed from the shaft, and an annular groove and slots were machined into it to form the webs 40 and 41. Thereafter, the sealing surface 31 was relapped to restore it to optically flat condition. When the thus modified member was fastened to the shaft by the set screw 39, with substantially the same torque as was applied in the first test, the sealing surface 31, when compared to the optically flat glass as in the first test, produced a parallel interference band pattern, indicating true flatness of the sealing surface within one interference band, or less than ten millionths of an inch.

The terms "right" and "left" have been used herein merely to facilitate description of the invention with reference to the drawings; these terms are not intended to limit the scope of the invention as defined in the claims.

From the foregoing description, it will be evident that the sealing member of the invention may be modified in various ways to accommodate it to particular installations without departing from the claims. Moreover, the sealing member may cooperate with complementary sealing ring subassemblies of substantially different construction from those shown herein by way of examples. The complementary sealing surfaces of the stationary and rotary sealing rings in a given installation need not be radial, as shown in the drawings, but may be of conical, spherical, or other surface configuration, as understood by persons conversant with mechanical seals.

Whereas, the sealing member 55 is shown as having a mounting ring portion and a sealing ring portion of equal outer diameter to enable it to be accommodated readily in a uniform bore having substantially the same diameter, and the sealing members 15 and 55 are shown as having axial bores of uniform diameter permitting them to conform to a uniformly cylindrical shaft, these diameters may differe depending upon the shape of the bore or the shaft with which a particular sealing member is associated.

Although the sealing members 15 and 55, as shown in the drawings, have webs that are segmental and that have radii equal to the bores of the sealing members, it will be understood that the webs may have cross sections of other than segmental shape, and that they may be located anywhere between the inner diameter and the outer diameter of the ring portions.

I claim:

1. In combination, a sealing member for a mechanical seal and a support member therefor including:
    (A) said support member having a generally cylindrical surface for mounting said sealing member;
    (B) said sealing member being mounted on said support member and comprising a monolithic structure having
        (a) a mounting ring portion with a substantially cylindrical mounting surface in juxtaposition with the mounting surface of said support member,
        (b) regulatable means for clamping said mounting ring portion to the mounting surface of said support member,
        (c) a closed sealing ring portion axially aligned with and axially spaced from said mounting ring portion, and having a substantially annular sealing surface thereon,
        (d) axially extending web means, having less than 360° of circumferential extent, integral with said mounting ring portion and said sealing ring portion for drivingly connecting said sealing ring portion to said mounting ring portion, and (e) means for sealing said sealing ring portion to said support member;

wherein the improvement comprises;

(f) said mounting hing portion being a closed ring;

(g) said regulatable means comprising adjustable means on one of said mounting ring portion and said support member reacting, at a limited circumferential area, with stationary means on the other of said mounting ring portion and said support member to apply radial force to said mounting ring portion at a limited circumferential area thereof for clamping said mounting ring portion to the mounting surface of said support member, said radial force producing two zones of greatest stress in said mounting ring portion, the first of which is at and adjacent to said limited circumferential area of said mounting ring portion and the second of which is located substantially opposite to the first; and (h) said axially extending means being a pair of circumferentially spaced web means positioned on diametrically opposite sides of said sealing member, each of said pair of web means being spaced substantially 90° from said limited circumferential area of said mounting ring portion, whereby stresses in said mounting ring portion are substantially prevented from being reflected in said sealing ring portion to distort said sealing surface.

2. In combination, a sealing member for a mechanical seal and a support member therefor as defined in claim 1, wherein said adjustable means comprises a radially disposed set screw threadedly carried by one of said mounting ring portion and said support member and bearing against the other of said mounting ring portion and said support member.

3. In combination, a sealing member for a mechanical seal and a support member therefor as defined in claim 1, wherein each of said pair of web means has a radial thickness substantially less than the radial thickness of either of said ring portions and each is disposed adjacent to the inner peripheries of said ring portions.

4. In combination, a rotary sealing member for a mechanical seal and a rotatable shaft for supporting the sealing member including:

(A) said shaft having a generally cylindrical outer surface for mounting said sealing member;

(B) said sealing member being mounted on said shaft and comprising a monolithic structure having (a) a mounting ring portion with a substantially cylindrical inner mounting surface in juxtaposition with the mounting surface of said shaft, (b) regulatable means for clamping said mounting ring portion to the mounting surface of said shaft, (c) a closed sealing ring portion axially aligned with and axially spaced from said mounting ring portion, and having a substantially annular sealing surface thereon, (d) axially extending web means, having less than 360° circumferential extent, integral with said mounting ring portion and said sealing ring portion for drivingly connecting said sealing ring portion to said mounting ring portion, and (e) means for sealing said sealing ring portion to said shaft;

wherein the improvement comprises:

(f) said mounting ring portion being a closed ring;

(g) said regulatable means comprising adjustable means on said mounting ring portion reacting, at a limited circumferential area, with said shaft to apply outward radial force to said mounting ring portion at a limited circumferential area thereof for clamping said mounting ring portion to the mounting surface of said shaft, said radial force producing two zones of greatest stress in said mounting ring portion, the first of which is at and adjacent to said limited circumferential area of said mounting ring portion and the second of which is located substantially opposite to the first; and (h) said axially extending means being a pair of circumferentially spaced web means positioned on diametrically opposite sides of said sealing member, each of said pair of web means being spaced substantially 90° from said limited circumferential area of said mounting ring portion, whereby stresses in said mounting ring portion are substantially prevented from being reflected in said sealing ring portion to distort said sealing surface.

5. In combination, a rotary sealing member for a mechanical seal and a rotatable shaft for supporting the sealing member as defined in claim 4, wherein said adjustable means comprises a radially disposed set screw threadedly carried by said mounting ring portion and bearing against said shaft.

6. In combination, a rotary sealing member for a mechanical seal and a rotatable shaft for supporting the sealing member as defined in claim 4, wherein each of said pair of web means has a radial thickness substantially less than the radial thickness of either of said ring portions and each is disposed adjacent to the inner peripheries of said ring portions.

7. In combination, a stationary sealing member for a mechanical seal and a stationary housing member for supporting the sealing member including:

(A) said housing member having a generally cylindrical inner surface for mounting said sealing member;

(B) said sealing member being mounted on said housing member and comprising a monolithic structure having (a) a mounting ring portion with a substantially cylindrical outer mounting surface in juxtaposition with the mounting surface of said housing member, (b) regulatable means for clamping said mounting ring portion to the mounting surface of said housing member, (c) a closed sealing ring portion axially aligned with and axially spaced from said mounting ring portion, and having a substantially annular sealing surface thereon, (d) axially extending web means, having less than 360° circumferential extent, integral with said mounting ring portion and said sealing ring portion for drivingly connecting said sealing ring portion to said mounting ring portion, and (e) means for sealing said sealing ring portion to said housing member;

wherein the improvement comprises:

(f) said mounting ring portion being a closed ring;

(g) said regulatable means comprising adjustable means on said housing member reacting, at a limited circumferential area, with said mounting ring portion to apply inward radial force to said mounting ring portion at a limited circumferential area thereof for clamping said mounting ring portion to the mounting surface of said housing member, said radial force producing two zones of greatest stress in said mounting ring portion, the first of which is at and adjacent to said limited circumferential area of said mounting ring portion and the second of which is located substantially opposite to the first; and (h) said axially extending means being a pair of circumferentially spaced web means positioned on diametrically opposite sides of said sealing member, each of said pair of web means being spaced substantially 90° from said limited circumferential area of said mounting ring portion, whereby stresses in said mounting ring portion are substantially prevented from being reflected in said sealing ring portion to distort said sealing surface.

8. In combination, a stationary sealing member for a mechanical seal and a stationary housing member for supporting the sealing member as defined in claim 7, wherein said adjustable means comprises a radially disposed set screw threadedly carried by said housing member and bearing against said mounting ring portion.

9. In combination, a stationary sealing member for a mechanical seal and a stationary housing member for supporting the sealing member as defined in claim 7, wherein each of said pair of web means has a radial thickness substantially less than the radial thickness of either of said ring portions and each is disposed adjacent to the inner peripheries of said ring portions.

References Cited

UNITED STATES PATENTS

| 3,081,099 | 3/1963 | Walker et al. | 277—88 |
| 3,101,200 | 8/1963 | Tracy | 277—81 X |
| 3,116,066 | 12/1963 | Koppius | 277—38 |
| 3,191,945 | 6/1965 | Andresen | 277—88 X |

SAMUEL ROTHBERG, *Primary Examiner.*